United States Patent Office 3,481,335
Patented Dec. 2, 1969

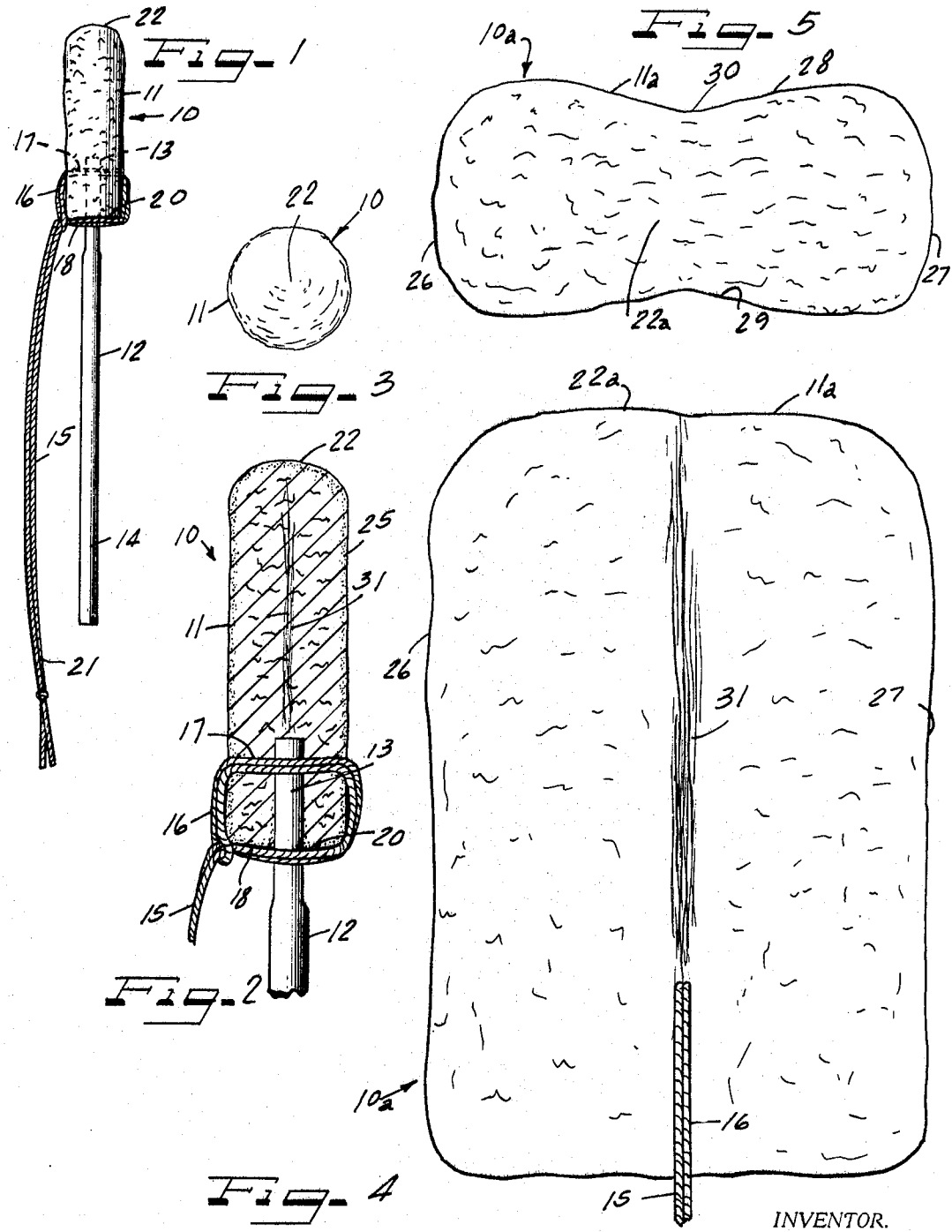

3,481,335
VAGINAL TAMPON
Fred W. Beutlich, Chicago, Ill., assignor to Beutlich, Inc., Chicago, Ill., a corporation of Illinois
Filed Sept. 13, 1967, Ser. No. 667,572
Int. Cl. A61f *13/20;* A61l *15/03*
U.S. Cl. 128—270          5 Claims

ABSTRACT OF THE DISCLOSURE

A vaginal insert or tampon, the body of which is composed of absorbent fibrous material, compacted into an elongated generally cylindrical shape with its side and end walls coated with 9-amino acridine hydrochloride, a withdrawable stick-like handle and support embedded in one end of the fibrous mass, and a cord-like member having a portion extending through said one end of the mass and a free end portion adapted to be grasped in withdrawing the mass from the vaginal tract. The 9-amino acridine hydrochloride supplies medication for the treatment of monilial vaginitis, trichomonas vaginistis, and other infections caused by Gram-negative and Gram-positive organisms.

SUMMARY OF THE INVENTION

While 9-amino acridine is recognized in the literature as having effectiveness in the treatment of vaginitis and cervicitis, and to be active against Gram-positive cocci and spore-bearing anaerobes, as well as against Gram-positive and Gram-negative baccilli, and ointments or creams containing acridine have been used for treatment of such infections, the vaginal tampon of the present invention is believed to be novel in providing a completely disposable insert comprising a relatively firm mass of dry absorbent fibrous material in a compact, adherent state, and of an elongated generally cylindrical shape, provided with a generally over-all coating of 9-amino acridine hydrochloride adherent in dry state to the absorbent mass of material and affording a reservoir of medication when inserted and retained in the vaginal tract. A relatively rigid stick-like support embedded at its one end in the mass of fibrous material and presenting at its other end a free, manually engageable handle provides a means for inserting the tampon in place and then of being readily withdrawn. Additionally, a cord-like member, having a portion extending completely transversely through the same end of the fibrous mass as that in which the stick-like support is embedded, facilitiates ultimate withdrawal of the insert. The tampon is therefore easy to use, no inserter or applicator being needed, and since it is completely disposable, the patient cannot reinfect herself.

DESCRIPTION OF THE DRAWING

In the drawings:
FIGURE 1 is an elevational view of a tampon embodying the principles of my invention;
FIGURE 2 is an enlarged, longitudinal cross sectional view, partly in elevation and broken away;
FIGURE 3 is a top plan view of the tampon of FIG. 2;
FIGURE 4 is a fragmentary side elevational view of the insertable end of the tampon after it has become swollen from absorption of moisture, with the supporting stick-like handle removed; and
FIGURE 5 is the top plan view of the insert of FIG. 4.

DETAILED DESCRIPTION OF THE DRAWINGS

The tampon of my invention is indicated generally by the reference numeral 10 and comprises a relatively firm mass of dry absorbent fibrous material in a compacted adherent state and of an elongated generally cylindrical shape 11, supported by a stick 12, one end 13 of which extends for a short distance into the corresponding end of the fibrous mass 11 for removable retention therein. The freely extending length of the stick 12 provides a manually engageable handle 14. A cord-like member 15 is provided with a loop 16, a portion 17 of which extends transversely through the mass of fibrous material 11 adjacent the embedded end 13 of the supporting stick 12, and another portion 18 of which extends along the side walls of the fibrous mass 11 and the end wall 20 thereof, with a substantial length 21 extending freely from said loop 16. Said freely extending portion 21 can be readily grasped manually to withdraw the insert from the vaginal tract after the desired degree of medication has been effected. The upper free end of the fibrous mass 11, indicated by the reference numeral 22 is rounded, as illustrated, for ease of insertion, while the other end, indicated as the lower end 20, is generally flat.

A more or less superficial layer 25 of 9-amino acridine hydrochloride in dry form provides an over-all coating for the fibrous mass 11, including the end portions 22 and 20. The coating of the fibrous mass with 9-amino acridine hydrochloride is suitably accomplished by immersing the fibrous mass 11 for a short time in a solution of 9-amino acridine hydrochloride, such as an alcohol solution of the compound, and then allowing the alcohol to evaporate. The 9-amino acridine hydrochloride, which is yellow in color, impregnates the superficial surface portion of the mass 11 for only a short distance inwardly to provide a coating 25 (FIG. 3). For the usual size of tampon, which, in its dry state, is approximately 1½ inches in length by ½ inch in diameter, the weight of 9-amino acridine hydrochloride used, also in dry state, should be approximately 14 mg. Such an amount of 9-amino acridine hydrochloride provides a reservoir of the medicament for release over the time that may be prescribed for the treatment. Obviously, more or less of the compound may be used, but the amount specified is adequate for a single treatment.

FIGS. 4 and 5 show the extent to which the fibrous mass of material 11 is swollen to several times its original volume when it is more or less thoroughly saturated with moisture. As illustrated in FIG. 5, in which similar reference numerals with the subscript $a$ are used, the mass of fibrous material 11$a$ is largely expanded in a transverse direction to provide enlarged rounded side walls 26 and 27 and intermediate side walls 28 and 29 that are somewhat constricted medially, as at 30, due largely to the manner in which the mass 11 of fibrous material is manufactured. The fibrous material, itself, may be composed of natural or synthetic fibers having a high degree of absorptivity, such as natural long staple cotton fibers or relatively long regenerated cellulose fibers. Relatively longer fibrous strands, indicated by the reference numeral 31 (FIG. 4), extend more or less axially and centrally of the fibrous masses in 11 and 11$a$ and aid in firming the fibrous mass 11 against lateral flexing, in the initial dry state of the fibrous mass 11.

The fibrous mass 11 is of sufficient firmness in its dry state as to retain its elongated generally cylindrical form, and is sufficiently compacted about the end 13 of the stick-like support 12 to retain said end within the lower end thereof without falling out, yet permit it to be easily removable manually. Thus, after insertion in the vaginal tract, the stick-like support 12 can be easily removed, leaving the fibrous mass portion 11 in place with the superficial layer 25 of 9-amino acridine hydrochloride in contact with the walls of the vaginal tract throughout the length of said fibrous mass 11. As the tampon continues to be retained in the vaginal tract, moisture will gently enlarge the tampon, placing the bactericidal 9- amino acridine hydrochloride directly and continuously in contact with the walls of the vagina and the organisms causing the infection. The tampon, if properly inserted, will not fall out during continued use, yet upon removal is completely disposable so that the patient cannot re-infect herself.

One tampon as described herein may be used daily at night for 12 days, or twice daily—morning and night—may be necessary in severe infections.

It will be understood that modifications and variations may be effected without departing from the scope of the novel concepts of the present invention.

I claim:

1. A medicated vaginal tampon comprising a relatively firm mass of dry absorbent fibrous material in a compact adherent state and of an elongated generally cylindrical shape:

a relatively rigid stick-like support embedded at its one end in said mass and presenting a free, manually engageable handle, and a flexible cord-like member having an embedded extent thereof completely passing through said mass adjacent said embedded end of said support and an outside extent thereof that is manually engageable, said mass having a substantially over-all surface coating of an antifungal and antibacterial medicating agent adherent to said mass, said absorbent fibrous material upon extended contact with the walls of the vaginal tract swelling to several times its initial dry volume so as to be retained therein when said support is withdrawn from said mass.

2. A medicated vaginal tampon as defined by claim 1 wherein, said agent is 9-amino acridine hydrochloride.

3. A vaginal tampon as defined by claim 1 wherein:

said stick-like support is embedded within an end of said mass for a short distance only, and said cord-like member has a looped portion extending transversely through said mass and along the outside and included end wall of said mass.

4. A vaginal tampon as defined by claim 3, wherein:

said mass has elongated fibers extending lengthwise of said cylindrical shape reinforcing the mass and increasing its resistance to lateral flexing while in a dry state.

5. A vaginal tampon as defined by claim 2, wherein:

said 9-amino acridine hydrochloride presents a yellow colored coating extending over the side and end walls of said mass.

References Cited

UNITED STATES PATENTS

| | | | |
|---|---|---|---|
| 3,091,241 | 5/1963 | Kellett | 128—270 |
| 3,409,011 | 11/1968 | Mittag | 128—263 |

ADELE M. EAGER, Primary Examiner

U.S. Cl. X.R.

128—285; 424—28